(No Model.) 2 Sheets—Sheet 1.

C. R. REID.
SEED PLANTER AND FERTILIZER DISTRIBUTER.

No. 501,362. Patented July 11, 1893.

WITNESSES:
H. Walker
C. Sedgwick

INVENTOR
C. R. Reid
BY Munn & Co.
ATTORNEYS.

(No Model.) 2 Sheets—Sheet 2.
C. R. REID.
SEED PLANTER AND FERTILIZER DISTRIBUTER.
No. 501,362. Patented July 11, 1893.
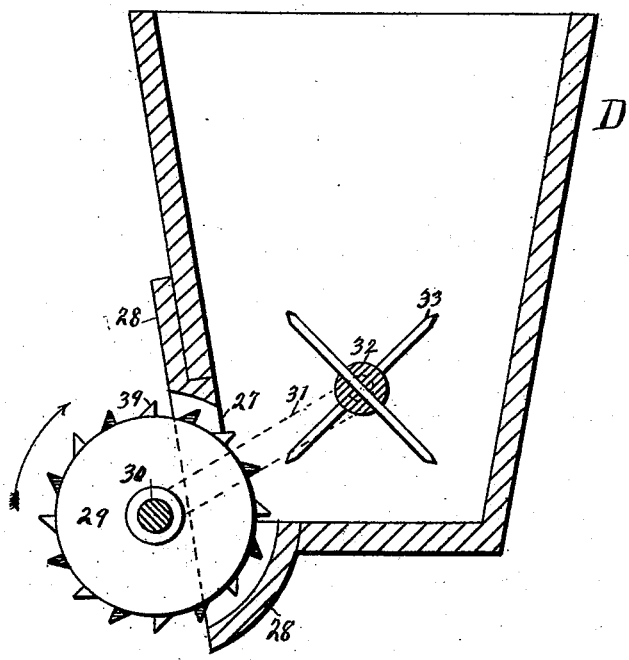
WITNESSES:
H. Walker
C. Sedgwick
INVENTOR
C. R. Reid
BY Munn & Co
ATTORNEYS.

UNITED STATES PATENT OFFICE.

CHARLES RUFUS REID, OF HEIDELBERG, MISSISSIPPI.

SEED-PLANTER AND FERTILIZER-DISTRIBUTER.

SPECIFICATION forming part of Letters Patent No. 501,362, dated July 11, 1893.

Application filed November 14, 1892. Serial No. 451,926. (No model.)

*To all whom it may concern:*

Be it known that I, CHARLES RUFUS REID, of Heidelberg, in the county of Jasper and State of Mississippi, have invented a new and Improved Seed-Planter and Fertilizer-Distributer, of which the following is a full, clear, and exact description.

My invention relates to an improvement in seed planters and fertilizer distributers, and has for its object to provide a machine simple and durable in all of its parts, and to so construct the machine that the plow may be wholly or in part lifted from the ground without stopping or interfering in the least with the action of the planting or distributing mechanism of the machine, and to drive the said distributing or planting mechanism by means of a driving wheel adapted to contact with the ground over which the machine is being drawn.

Another object of the invention is to provide a hopper and a feed wheel especially adapted for planting cotton or like seed, and for distributing fertilizer, which hopper and mechanism are so constructed as to insure a perfect and continuous delivery.

Another feature of the invention is to mount the driving or contact wheel upon spring supports, and to utilize the said supports as a carriage for the seed box and all of the driving mechanism connected with the box, and to provide a means whereby different styles of hoppers may be expeditiously and conveniently connected with or detached from the spring carriage.

The invention consists in the novel construction and combination of the several parts as will be hereinafter fully set forth and pointed out in the claims.

Reference is to be had to the accompanying drawings forming a part of this specification, in which similar figures and letters of reference indicate corresponding parts in all the views.

Figure 1:
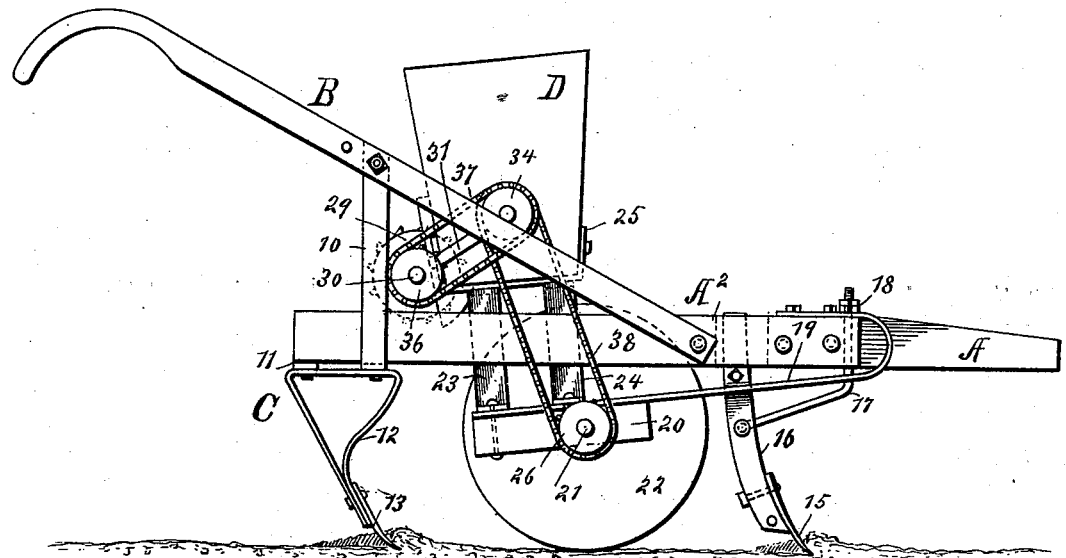
Figure 2:
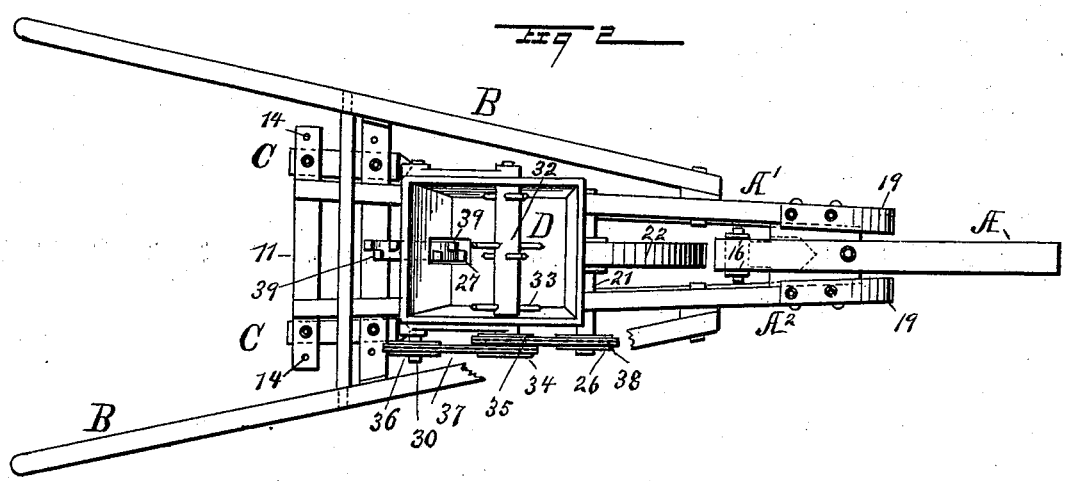

Figure 1 is a side elevation of a planter or fertilizer distributer constructed in accordance with my invention. Fig. 2 is a plan view of the same, one portion of the handle being broken away. Fig. 3 is an enlarged vertical section taken through the hopper adapted to receive fertilizer or cotton seed, and illustrating the feed wheel in side elevation.

In carrying out the invention the main beam A of the plow has attached to its rear portion two side beams A' and A². The attachment between the main beam and the side beams is so made that the main beam extends rearward some little distance between the side beams. The handles B of the implemens are attached preferably to the side beams in any suitable or approved manner, and are supported at or near their central portions by a metal yoke 10, the base portion of the yoke being secured to the side beams A' and A², near their rear ends, and parallel with a cross bar 11, which is secured to the extreme rear ends of the said side beams, while the upright members of the yoke are secured preferably to the inner faces of the handles B.

Covering devices C, are attached to the rear portions of the side beams, the attachment of the devices being made to the base portion of the yoke 10 and to the cross bar 11. The covering devices may be of any approved construction, but preferably the device employed comprises two independent shank arms 12, which are shaped somewhat triangularly and are given a downward and forward inclination, the listing or covering blades 13, being secured to the lower ends of the shank arms in such manner that the blades may be readily removed.

The covering arms 12, as heretofore stated, are attached to the cross bar 11 and the yoke 10, and the attachment is an adjustable one, it being effected between the outer faces of the side beams and the outer ends of the cross bar 11 and the horizontal member of the yoke; these portions of the cross bar and yoke are provided with apertures 14, which enable the operator to set the covering devices near together or far apart, so that furrows may be run any distance apart that the operator may desire. The furrow is made by means of a plow or furrow opener 15, which is adjustably and removably secured to the lower end of a plow shank 16, the shank being downwardly and forwardly curved, and the upper end of the plow shank is clamped over the rear projecting end of the main beam.

No fastening devices connect the plow shares directly with the main beam, but a set screw is provided in the shank immediately below the beam, the shank being made of two metal parts properly connected and spaced. The plow shank is held firmly in its desired position through the medium of a grass or brace rod 17, one end of which rod is pivotally attached to the plow shank, as shown in Fig. 1, while the other end is carried upward through an aperture in the main beam; and the upper projecting end of the grass rod or brace carries lock nuts 18, or their equivalents.

When it is desirable to incline the plow shank forwardly or rearwardly to a greater or less degree than illustrated, it may be accomplished by raising or lowering the end of the grass or brace rod which is carried through the main beam.

Two spring arms 19, are secured at their forward ends, one to the forward portion of each side beam A' and A². The spring arms are curved downwardly and rearwardly beneath the side beams, the rear ends of the arms extending preferably past the center of said beams. Each spring arm has secured to it a bearing 20, and in these bearings a shaft 21, is journaled, having secured centrally upon it a wheel 22. This wheel is adapted to travel upon the ground and to support and impart motion to the seed-dropping or fertilizer distributing mechanism that may be carried by the machine.

Any approved mechanism may be employed for supporting the seed box and mechanism from the wheel, but preferably a mechanism of the lightest and simplest character is employed for that purpose, and it is desirable that the supporting mechanism shall be so constructed as to enable an operator to readily connect it with a seed box, for example. One form of this supporting mechanism is illustrated in the drawings, and consists in attaching to the spring arms above the boxes 20 two metal arch standards 23 and 24, and these standards are adapted to carry sockets 25, the sockets usually consisting of bars shaped practically as an inverted U, the upright members of the bars being flared in opposite directions; and the said upright members are provided with openings whereby bolts may be readily passed through the sockets and into the box or other mechanism to be supported.

The driving wheel 22, which may be termed a contact wheel, since it is to contact with the ground, runs between the arched standards 23 and 24, between and in front of the covering devices C and immediately back of the shank carrying the furrow opener. The above is a complete description of the preferred form in which the body of the implement is constructed, with the exception that at one end of the shaft 21 carrying the drive or contact wheel 22 a pulley 26, is secured, preferably of the sprocket type.

I will next describe the construction of the hopper adapted to receive cotton or like seed, or fertilizer, and the feed mechanism carried by the hopper. The hopper is shown best in Fig. 3, and is designated as D. It is given a tapering form, the lower end being the narrowest in order that the contents of the hopper will naturally slide to the bottom as the contents are removed from the hopper, the outlet being at the lower rear end, as shown at 27 in said Fig. 3, but the outlet opening may be otherwise located if in practice it is found desirable. The opening 27, is surrounded by a chute 28, the chute being practically of semi-circular form; and a portion of the chute extends within the opening flush with the bottom and one side wall of the hopper. A feed wheel 29, revolves in the chute 28, a portion of the periphery of the wheel entering the hopper at the outlet opening 27. The feed wheel is mounted upon a shaft 30; in fact, the shaft and feed wheel are preferably integral parts, or one is firmly secured to the other. The extremities of the shaft 30, are journaled in bearings formed at the lower extremity of arms 31, said arms being attached in any suitable or approved manner to the outer side faces of the hopper and extend diagonally downward from a point near the center of the hopper beyond the face in which the outlet opening is produced. The arms 31, have bearings at both ends, the upper bearings being adapted to receive and journal the trunnions of a drum or shaft 32, mounted transversely in the hopper near its bottom portion, and transversely or in front of the outlet opening as shown in Fig. 3. The drum is provided with a series of radiating teeth 33, arranged in staggered order, and upon one trunnion of the drum two pulleys 34 and 35 are securely mounted, while upon the same side of the hopper a larger pulley 36 is secured upon one end of the feed shaft 30. The pulleys 34 and 36, are connected by a chain belt 37, and the inner pulley 35 and the pulley upon the lower shaft 21 of the frame are connected by a belt 38, as best shown in Figs. 1 and 2. It is sometimes preferable that but one driving belt be employed, in which event the three pulleys 26, 34 and 36 are used. By these means as the contact or driving wheel 22 is revolved, a like motion is imparted to both the drum and the feed wheel. The toothed drum is adapted to serve in the capacity of an agitator and separator, as it keeps the contents of the hopper constantly moving, and prevents said contents from forming into lumps, and if any lumps exist it separates the same. The peripheral surface of the feed wheel is of peculiar construction; it is provided with a series of teeth 39, but the teeth, as shown in Fig. 3, are arranged in two circumferential rows, the teeth in one row being placed preferably opposite the center of the space between the teeth of the other row; thus the arrangement of the teeth is a staggered one. A feed wheel constructed in this manner insures a steady constructed in this manner insures a steady and continuous delivery of the contents of the hopper to the chute, since a series of alternating pockets is produced, delivering the contents of the pockets one after the other to the chute, and owing to the staggered arrangement of the agitator or stirrer arms the seed or fertilizer will be forced into the pockets of the wheel and each pocket will receive its proper amount of material.

When a hopper constructed as shown in Fig. 3 is carried by the spring arms 19 and the implement is drawn forward, the furrow opener will produce a furrow, the contact wheel will travel in the furrow, will be revolved and will impart movement to the feed wheel, which will deliver the contents of the hopper D through the chute to the furrow, and the furrow will be closed by the covering devices C.

It is evident that the plow may be raised from the furrow either partially or entirely without interfering with the action of the feed mechanism, since the contact or driving wheel 22 will continue in engagement with the ground. It is further evident that the covering devices may be reversed, that is, made to face the rear, and that the covering blades 13 may be removed and a covering board be substituted, connecting both of the arms 12. It will also be observed that the hopper, the mechanism carried by the hopper and the driving mechanism are all spring supported; therefore, no matter what movement may be given to the frame of the machine, that is, the beams and the parts rigidly connected therewith, the portions of the machine supported by the springs will not be affected.

The short bend at the front forward ends of the spring arms will cause them to give readily to the plows and the frame to which the plows are rigidly fastened. The spring support for the driving wheel 22 also facilitates carrying the machine in successful operation over rough or undulating ground. The pulleys 26, 34, 35 and 36, are so calculated as to size that each will make a different number of revolutions in a given time, or a different number of revolutions to one revolution of the driving or contact wheel 22, which will make possible, changes in space between the hills.

The simplicity and durability of the machine described are apparent, and it is further evident that the machine may be economically manufactured and that it will operate successfully upon land of any character.

Having thus described my invention, I claim as new and desire to secure by Letters Patent—

1. In a planter and distributer or like machine, the combination with the frame, of a spring supported wheel and a hopper and an operating mechanism carried by said wheel, substantially as set forth.

2. In a machine of the character described, the combination with the frame and its rearwardly extending spring arms of the wheel journaled in bearings mounted on the rear ends of the said arms, and a hopper and an operating mechanism carried by the said wheel, substantially as set forth.

3. In a machine of the character described, the combination with the frame, the rearwardly extending spring arms and the wheel journaled in bearings on the rear ends of said arms, of a hopper carried by the wheel and provided with an outlet, a feed wheel journaled on the hopper and projecting into the said outlet, a stirrer mounted in the hopper, the stirrer and feed wheel shafts being geared together and to the drive wheel shaft, substantially as set forth.

4. In a machine of the character described a feed wheel provided on its periphery along the opposite edges thereof with integral teeth one set registering with the spaces between the teeth of the other set and the adjacent ends of the teeth of both series terminating at the middle of the periphery and the forward faces of the teeth being flat, substantially as set forth.

5. A planter comprising the frame having rearwardly extending spring arms on its under side, a wheel journaled in bearings carried by the rear ends of the spring arms and having a connected sprocket wheel, a hopper carried by the main wheel and having a stirrer provided on its shaft with a double sprocket, a chain connecting said sprockets, a feed wheel having staggered peripheral teeth entering the hopper and a sprocket chain connecting a sprocket wheel on the feed wheel shaft with said double sprocket, substantially as set forth.

CHARLES RUFUS REID.

Witnesses:
 Q. C. HEIDELBERG,
 W. J. MCFARLAND.